United States Patent [19]
Wiggins

[11] Patent Number: 5,123,993
[45] Date of Patent: Jun. 23, 1992

[54] METHOD AND APPARATUS FOR THE AUTOMATIC RECYCLING OF PLASTIC BOTTLES

[75] Inventor: William C. Wiggins, Palm Harbor, Fla.

[73] Assignee: Automated Recycling Corp., Bradenton, Fla.

[21] Appl. No.: 484,497

[22] Filed: Feb. 23, 1990

[51] Int. Cl.5 .................... B32B 35/00; B32B 31/18
[52] U.S. Cl. .................... 156/584; 156/94; 156/510; 134/104.4; 141/89; 141/144; 264/37; 15/63
[58] Field of Search ............ 156/94, 510, 584; 15/59, 60, 63; 134/104.4; 141/89, 144; 264/37

[56] References Cited

U.S. PATENT DOCUMENTS

| | | | |
|---|---|---|---|
| 3,771,574 | 11/1973 | Creed et al. | 141/144 X |
| 3,783,777 | 1/1974 | Killen et al. | 101/126 X |
| 4,013,497 | 3/1977 | Wolf | 156/154 |
| 4,033,804 | 4/1977 | Baldyga | 156/84 |
| 4,325,775 | 4/1982 | Moeller | 156/584 |
| 4,599,131 | 4/1986 | Matuszak | 156/584 |
| 4,661,195 | 4/1987 | Hopson | 156/344 |
| 4,715,920 | 12/1987 | Ruppman et al. | 264/37 X |
| 4,717,442 | 1/1988 | Hopson | 156/584 |
| 4,817,683 | 4/1989 | Laub, III et al. | 141/144 X |
| 4,834,826 | 5/1989 | Abe et al. | 156/344 |
| 4,956,033 | 9/1990 | Martin et al. | 156/344 X |

Primary Examiner—Michael W. Ball
Assistant Examiner—Mark A. Osele
Attorney, Agent, or Firm—Dominik, Stein, Saccocio, Reese, Colitz & Van Der Wall

[57] ABSTRACT

A method and apparatus for recycling used plastic bottles formed of a lower base cup and an upper container with a neck ring comprising in combination: a processing star wheel for supporting bottles by their neck rings and for moving the supported bottles sequentially through a plurality of processing stations; an input conveyor for sequentially feeding bottles to the processing star wheel; a first processing station for inserting pressurized air into the containers to return them to their essentially initial shape; a second processing station for inserting hot water into the containers for cleaning purposes and for effecting their contraction; a third processing station for removing the base cups from the containers; a base cup conveyor for feeding the separated base cups from the system for granulization and recycling; a fourth processing station for removing the labels from the containers; a label conveyor for feeding the separated labels from the system; a fifth processing station for removing the water from the containers; and a container conveyor for feeding the separated containers from the system for their granulization and recycling.

1 Claim, 7 Drawing Sheets

METHOD AND APPARATUS FOR THE AUTOMATIC RECYCLING OF PLASTIC BOTTLES

BACKGROUND OF THE INVENTION

1. Summary of the Invention

This invention relates to a method and apparatus for the automatic recycling of plastic bottles and, more particularly, to the conveying of used plastic bottles through a machine which continuously and automatically separates bottle containers and base cups for granulation and recycling.

2. Description of the Background Art

The disposal of trash is a worldwide problem. The problem is increased when non-biodegradable material such as plastic is involved. One particularly alarming aspect of this problem is the increasing number of plastic bottles being fabricated and used today. Such increasing numbers increase the need for their disposal. Such increasing numbers also mandate the need for their recycling to aleviate the disposal problem along with the problem of diminishing resources.

The problem of recycling plastic bottles has been long recognized. Proposed solutions to this problem, however, are inadequate. From a technical standpoint, proposed solutions generally involve grinding large quantities of plastics with the various types of plastic being intermixed and then segregating the plastic by types during processing. Negligible efforts have been expended in the preliminary mechanical separation of plastic by types prior to grinding and processing. Preliminary separation, if done properly, has been found to increase efficiency, convenience and economy in the recycling of plastic bottles.

As evidenced by the great number of prior patents and commercial devices and techniques, efforts are continuously being made in an attempt to improve robots. Such efforts are being made to recycle used plastic bottles more efficient, reliable, inexpensive and convenient to use. None of these previous efforts, however, provides the benefits attendant with the present invention. Additionally, the prior patents and commercial devices and techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

Therefore, it is an object of this invention to provide a method and apparatus for recycling used plastic bottles formed of a lower base cup and an upper container with a neck ring comprising in combination: a processing star wheel for supporting bottles by their neck rings and for moving the supported bottles sequentially through a plurality of processing stations; an input conveyor for sequentially feeding bottles to the processing star wheel; a first processing station for inserting pressurized air into the containers to return them to their essentially initial shape; a second processing station for inserting hot water into the containers for cleaning purposes and for effecting their contraction; a third processing station for removing the base cups from the containers; a base cup conveyor for feeding the separated base cups from the system for granulation and recycling; a fourth processing station for removing the labels from the containers; a label conveyor for feeding the separated labels from the system; a fifth processing station for removing the water from the containers; and a container conveyor for feeding the separated containers from the system for their granulization and recycling.

It is further object of this invention to separate used plastic bottles into their components, containers and base cups, for separate granulation and recycling.

It is yet a further object of the present invention to remove caps, tamper evident rings, labels and base cups from used plastic containers so as to simplify the recycling of their plastic components.

Lastly, it is an object of the present invention to continuously and automatically prepare used plastic bottles for recycling.

The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into a process for recycling used plastic containers comprising the steps of providing a plurality of used plastic containers; inserting hot liquid into the containers to effect their contraction and for cleaning; removing the liquid from the containers; and granulating the bottles for use in molding recycled containers or the like. The inserting and removing steps are carried out on a plurality of containers in a continuous and automatic cycle of operation. The continuous and automatic cycle of operation is carried out while the containers are suspended by their neck rings on a star wheel. The containers to be processed are two piece bottles with an upper container portion and a lower base cup portion and further including the step of separating the base cup portions from the container portions after the inserting of the liquid. The process further includes the step of injecting gas into the container prior to the inserting of the hot fluid in order to return the container to its essentially initial shape. The process further includes the step of removing the labels from the containers after the inserting of hot liquid.

The invention may be incorporated into a process for recycling used plastic bottles formed of an upper container portion and a lower base cup portion comprising the steps of providing a plurality of used plastic bottles; inserting gas under pressure into the container portions to return them to their original shape; inserting hot liquid into the reshaped container portion and for cleaning purposes and for effecting their contraction; removing the base cup portions from the cleaned and contracted container portions; removing the liquid from the baseless container portions; and granulating the container portion and base cup portions for use in molding recycled articles or the like.

The invention may further be incorporated into apparatus for recycling used plastic containers comprising conveyor means for supporting used plastic containers and for sequentially moving the supported containers in a continuous and automatic cycle of operation; means to insert hot liquid into the supported containers for effecting their contraction and for cleaning purposes; means to remove the liquid from the containers; and means to convey the containers for granulating and reuse in molding recycled containers or the like. The means to insert and the means to remove are located adjacent to the conveyor means for operation upon a plurality of containers in a continuous and automatic cycle of operation. The conveyor means is provided with notches for receiving the containers by neck rings. The containers are two piece containers with an upper container portion and a lower base cup portion and further including means for separating the base cup portions from the container portions after the means to insert hot liquid. The apparatus further includes means for injecting gas into the container portions prior to the means to insert the hot liquid in order to return the container portions to their essentially initial shape. The apparatus further includes means for removing the labels from the containers after the means to insert hot liquid.

The invention may also be incorporated into a system for recycling used plastic bottles formed of a lower base cup and an upper container with a neck ring comprising in combination a processing star wheel for supporting bottles by their neck rings and for moving the supported bottles sequentially through a plurality of processing stations; an input conveyor for sequentially feeding bottles to the processing star wheel; a first processing station for inserting pressurized air into the containers to return them to their essentially initial shape; a second processing station for inserting hot water into the containers for cleaning purposes and for effecting their contraction; a third processing station for removing the base cups from the containers; a base cup conveyor for feeding the separated base cups from the system for granulization and recycling; a fourth processing station for removing the labels from the containers; a label conveyor for feeding the separated labels from the system; a fifth processing station for removing the water from the containers; and a container conveyor for feeding the separated containers from the system for their granulation and recycling.

The input conveyor includes a screw feed conveyor to feed individual bottles to be processed toward the processing star wheel and an intermediate star wheel conveyor to transport the bottles from the screw feed conveyor to the processing star wheel. The screw feed conveyor, processing star wheel, and intermediate star wheel are driven from a common drive means to coordinate their rate of feeds. The processing star wheel is formed with edge notches to allow the bottles being moved to depend therefrom and wherein all of the processing stations are located therebeneath. The system further includes a nozzle for each bottle being fed by the processing star wheel and means to move the nozzle between an elevated, inoperative position and a lower operative position in contact with a container for inserting the pressurized air and, subsequently, the hot water into the container in a timed sequence while holding the container on the processing star wheel. The system further includes a circumferential cam extending radially inwardly toward the processing star wheel and associated cam followers positioned on the processing star wheel for each bottle whereby rotation of the star wheel and cam followers with respect to the cam will effect the sequential operation of the first processing station and the second processing station. The fourth processing station is a jet of fluid for applying a label removing force against the bottle after its contraction. The system further includes fixed finger means in the path of movement of the bottles following the second processing station to remove any base cups not removed by the jet. The system further includes a knife with a rotary notched blade rotatable about a horizontal axis above the bottles and in a plane essentially parallel with the direction of the movement of the bottle prior to the first processing station for removal ofr caps and tamper evident rings. The fifth processing station includes a knife with a rotary notched blade rotatable about a horizontal axis below the bottles and in a plane essentially parallel with the direction of the movement of the bottles following the fourth processing station.

The invention may further be incorporated in a system for recycling used plastic containers with a neck ring comprising in combination a processing star wheel for suspending containers by their neck rings and for moving the suspended containers sequentially through a plurality of processing stations an input conveyor for sequentially feeding containers to the processing star wheel; a first processing station for inserting pressurized air into the containers to return them to their essentially initial shape; a second processing station for inserting hot water into the containers for cleaning purposes; a third processing station for removing the water from the containers; and a container conveyor for feeding the containers from the system for their granulization.

Lastly, the invention may be incorporated into a system for recycling used one-piece plastic containers with a neck comprising in combination a processing conveyor for suspending containers by their necks and for moving the suspended containers sequentially through a plurality of processing stations; an input conveyor for sequentially feeding containers to the processing star wheel; a processing station for inserting hot water into the containers; an additional processing station for removing the water from the containers; and a container conveyor for feeding the containers from the system.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention, reference should be had to the following detailed description taken in conjunction with the accompanying drawings in which.

Similar reference characters refer to similar parts throughout the several Figures.

DETAILED DESCRIPTION OF THE INVENTION

OVERVIEW

Figure 1:
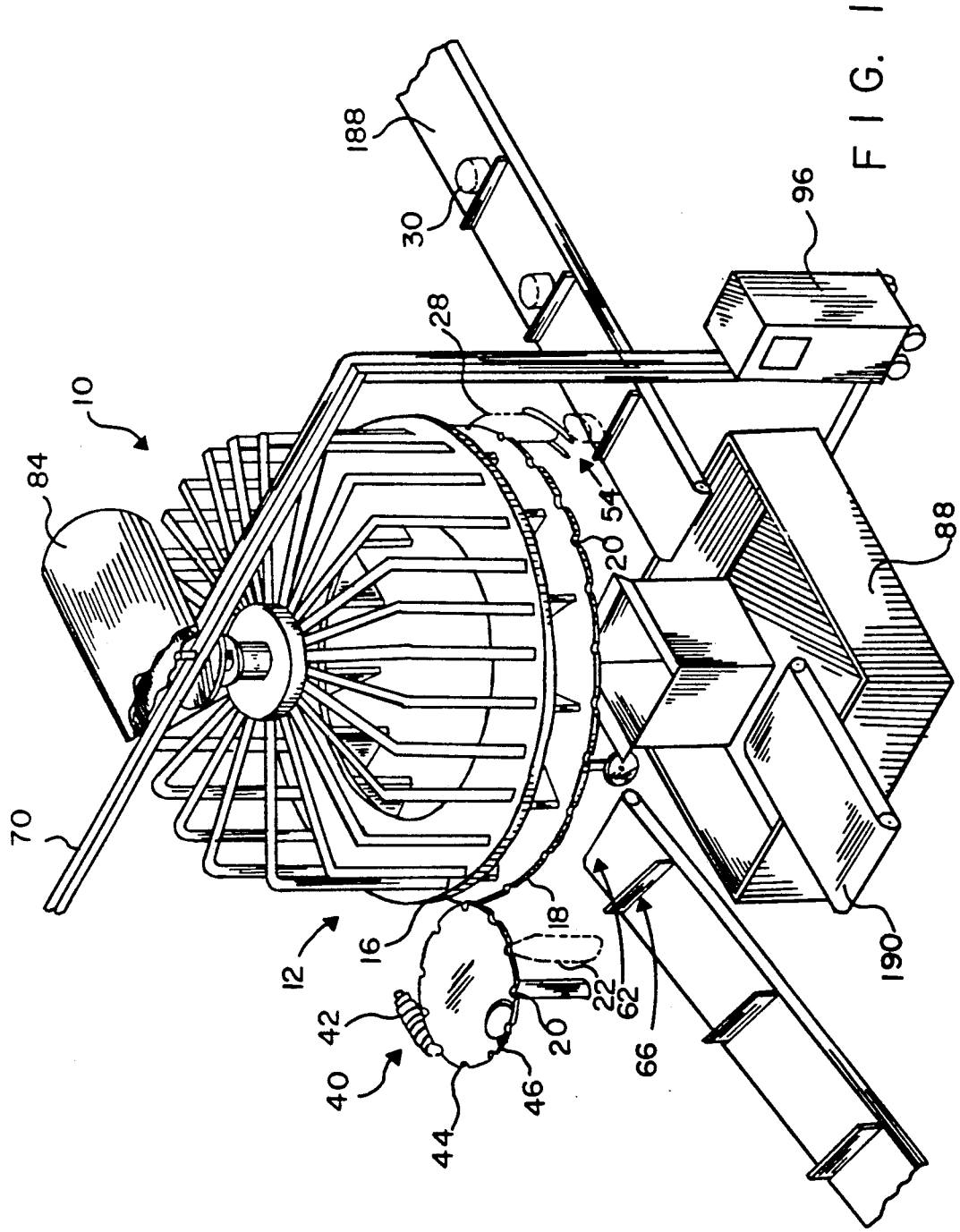
FIG. 1 is a perspective illustration of a system constructed in accordance with the principles of the present invention.
Figure 3:
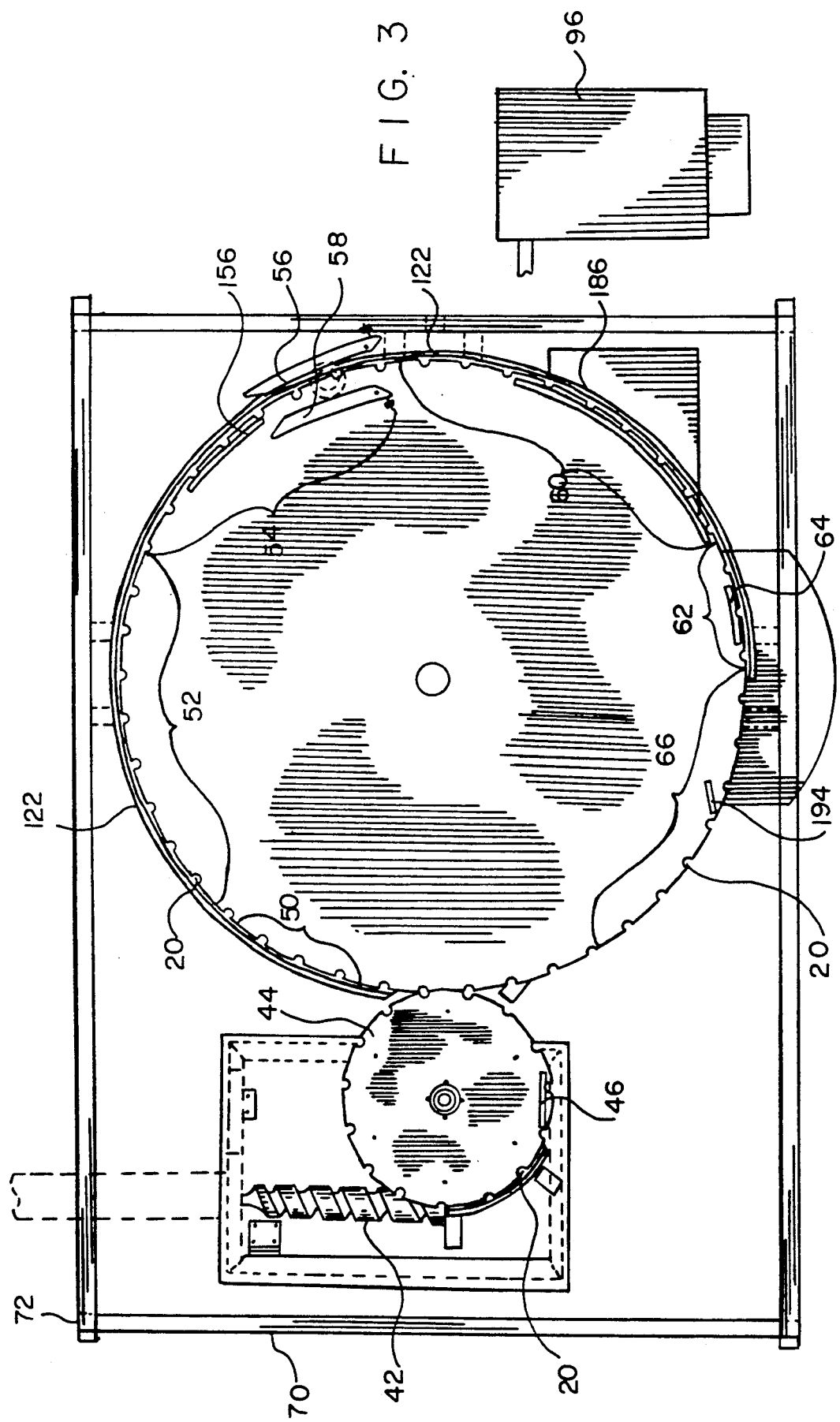
FIG. 3 is a sectional view of the system shown in FIG. 2 taken along line 3—3 of FIG. 2.
Figure 4:
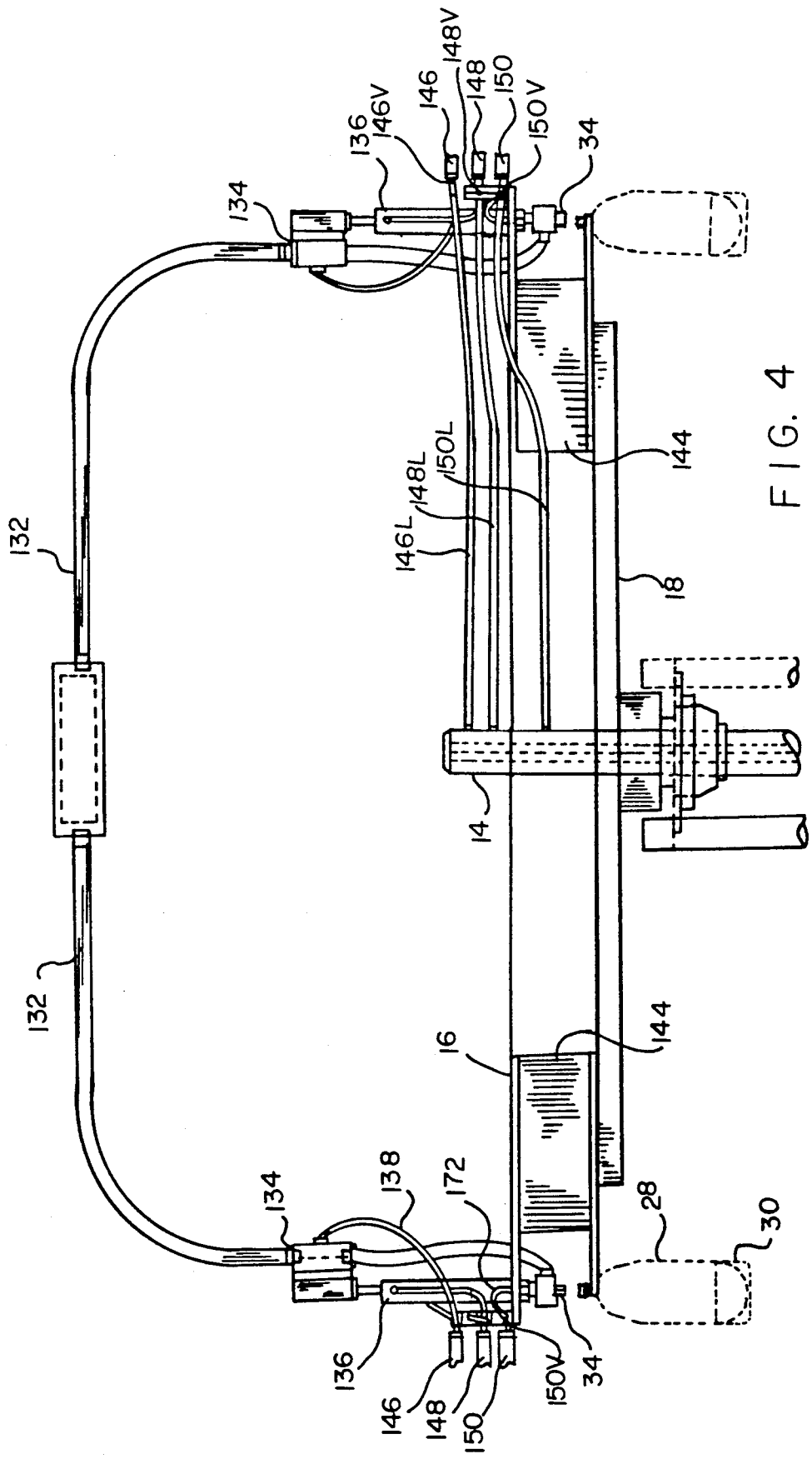
FIG. 4 is a side elevational view of the upper portion of the system shown in FIG. 2.
Figure 5:
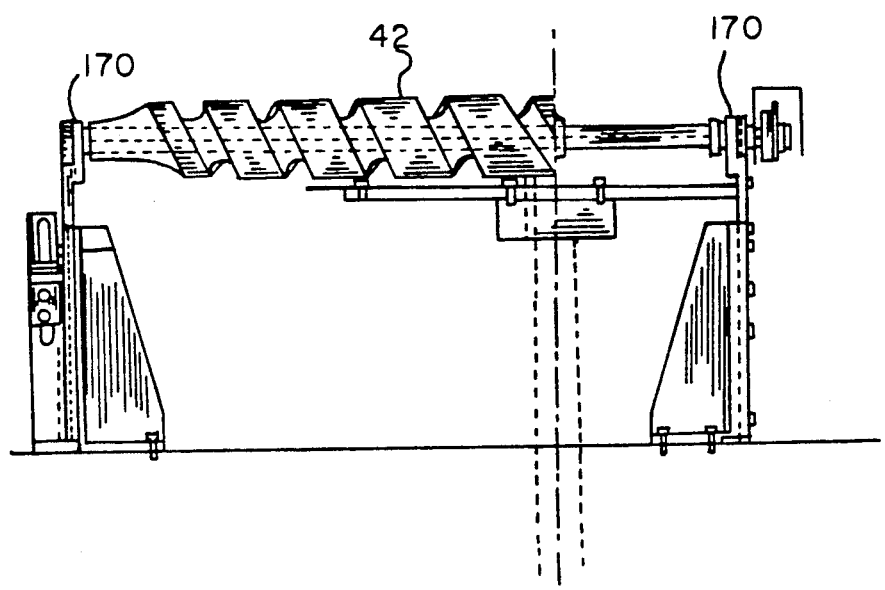
FIGS. 5 and 6 are plan and elevational views of the screw feed conveyor and infeed star wheel mechanisms shown in FIG. 1.
Figure 6:
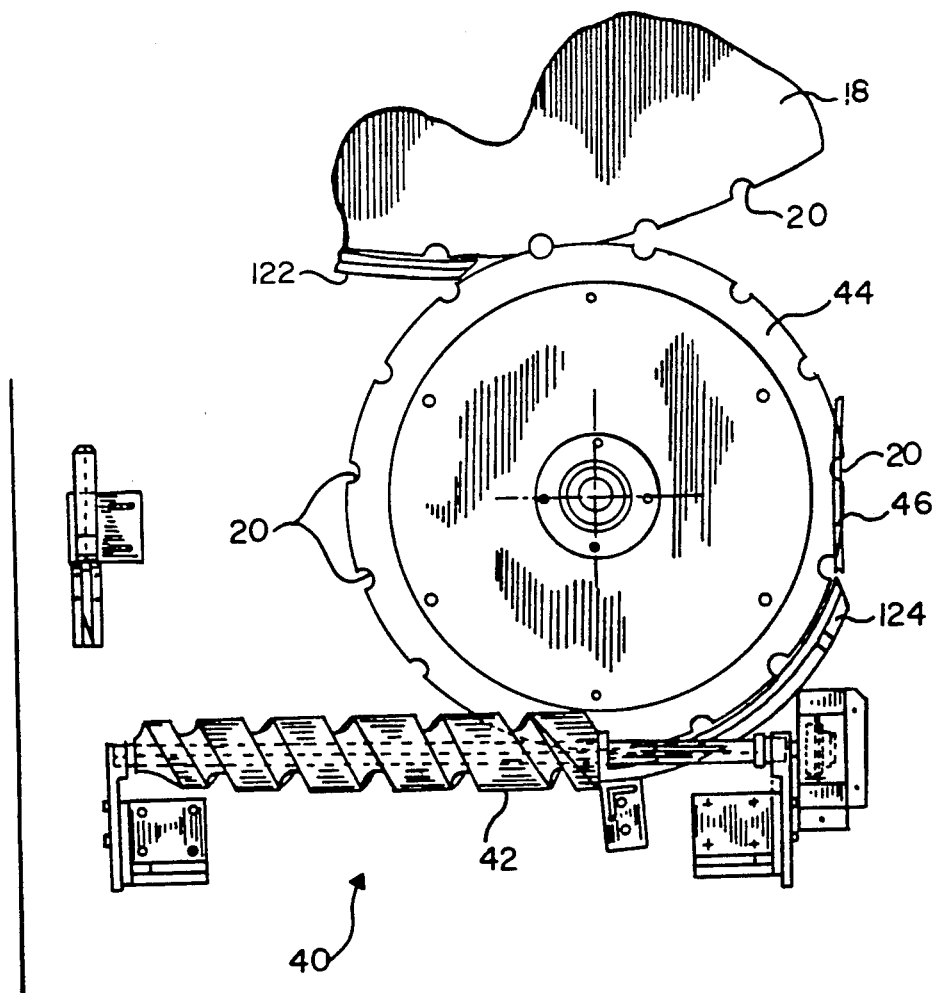

Shown in FIG. 1 is a perspective illustration of a system 10 constructed in accordance with the principles of the present invention. The system includes a disassembly machine 12 with a plurality of associated conveyors for bringing used plastic bottles thereto and for removing its component elements therefrom. From an overview standpoint, the disassembly machine includes a central, vertically oriented tube 14, rotatable about its axis. An upper ring 16 and a lower circular processing star wheel 18 are rotatable with the tube. The star wheel is formed with a plurality of edge notches 20 for receiving bottles 22 at their necks and for suspending them by their neck rings 24. The bottles are formed of upper containers 28, fabricated, for example, of polyethylene terepthalate (PET) or the like, and lower base cups 30, fabricated, for example, of high density polyethylene (HDPE) or the like, dissimilar plastics with labels on the containers. The bottles could also be one piece bottles, fabricated, for example, of polyethylene terephthalate (PET) or the like, with or without a petaloid bottom, or other types of containers such as jars. The upper disk contains the utilities including nozzle 34, one set for each notch and bottle. The tube is driven by a motor MOT-1 to rotate the star wheel, disk and bottles through various processing stations in a continuous and automatic cycle of operation as follows:

In Feed Station 40—At the 9 o'clock position as shown in FIG. 3, the bottles are fed continuously by a screw conveyor 42 from a preliminary conveyor and source of used bottles up to the rotating intermediate star wheel 44 for subsequent transportation through the various processing stations of the machine. Prior to the processing star wheel, the bottles being fed are axially split by a rotating toothed blade 46 to form a cut downwardly through the screw cap, tamper evident ring and neck of the bottle. The dropping off of the cap and tamper evident ring is thus automatically effected. Brushes 48 rotatable about vertical axes assist in their removal.

Shaping Station 50—The supported bottles are then sequentially injected with a gas, preferably air, under pressure while being conveyed. Such injection restores the used containers to their full and original, or essentially original, size and shape prior to further processing.

Heating Station 52—Having been restored to their proper size and shape, the containers are then sequentially filled, or substantially filled, with hot liquid, preferably water, to clean the containers and to effect their shrinkage. The heat promotes adhesive softening while the shrinkage of the container promotes separation of the labels and base cups, if any, from the containers.

Base Cup Stripping Station 54—Each rotating container is sequentially subjected to a high pressure spray of air and water to urge the base cup downward for promoting its removal from the container. Each container, regardless of diameter, is then sequentially intercepted by mechanical fingers 56 and 58 which function to contact and confirm base cup removal by urging the intercepted container downwardly. The base cup is dropped onto a conveyor for movement to a granulator for recycling remote from the machine. The air and water spray on the shrunk container effect base cup removal. The fingers assure such removal for deformed or excessively glued bottles.

Label Removal Station 60—High pressure fluid, preferably water, is then sprayed over the exterior surface of the container for label removal. A conveyor thereunderneath transports the label material away from the machine.

Cutting Station 62—Shortly before the 6:00 position, the lower portion of each bottle is cut by a rotating toothed blade 64. The cut allows the fluid from the bottle to drain to a sump for recycling back to the water tank located above the rotating tube column for use in processing in a continuous and automatic cycle of operation.

Discharge Station 66—The containers are then removed from the star wheel and fed by a conveyor to the granulators remote from the machine. Along the conveyor path, the bottles may be separated manually or automatically as a function of their color, clear or otherwise. The checking of containers for color is preferably done prior to discharge from either the star wheel or conveyor.

Disassembly Machine 12

Figure 2:
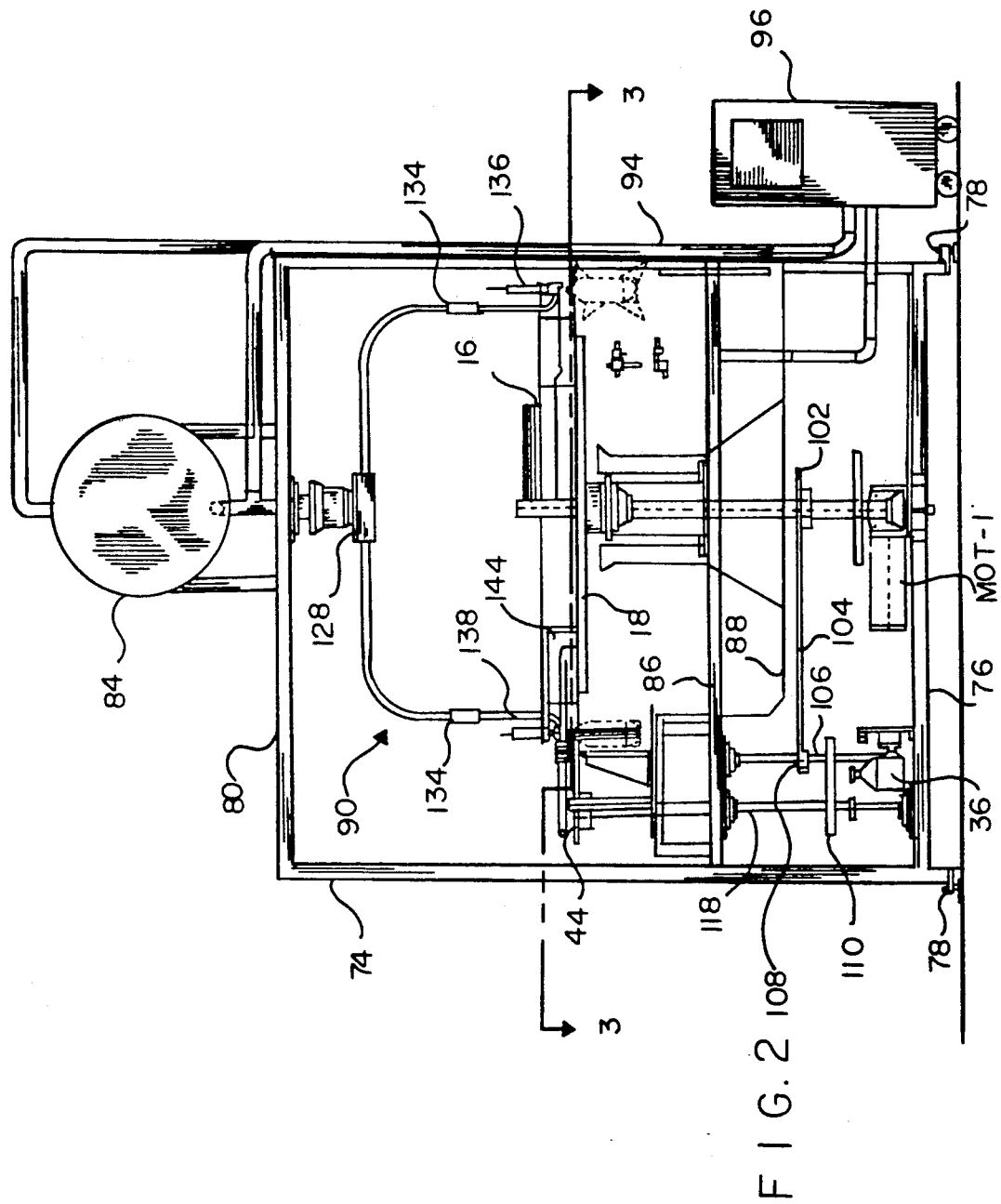
FIG. 2 is a side elevational view of the system shown in FIG. 1.

Shown in FIG. 2 is sectional view taken vertically through the center of the disassembly machine 12. The machine includes a frame 70 with four vertical corner posts 72 and upstanding sidewalls 74, preferably of a rigid transparent material, secured together in a cubical configuration. A lower base plate 76 supports the internal components of the machine and is secured to the corner posts 72 and sidewalls 74 to form a container for the processing liquids. The four corner posts 72 extend downwardly beneath the floor of the machine and include adjustable leveling pods 78 to maintain the machine in a proper elevational orientation. Also included with the machine is an upper roof frame 80 for supporting an upper tank 84 with a supply of liquid, preferably hot water with a detergent, to be utilized by the machine 12 in carrying out the disassembly process of the present invention.

Located within the walls 74 of the machine are horizontally oriented supporting bars 86 defining a lower liquid receiving sump 88 therebeneath and an upper operational region 90 thereabove. A vertically disposed tube 14, rotatable about its central axis, extends from the lower floor of the frame into a central part of the upper region. The lower sump is for receiving and providing a quantity of operational water with piping 94 through the frame coupled to the upper tank 84. Also coupled with respect thereto is an exterior temperature control subassembly 96 for feeding the water from the sump 88 to the upper tank 84.

Disposed within the lower frame is an electrical driven motor MOT-1 adapted to provide the rotational motion to the rotatable tube. A sprocket 102 and drive chain 104 located on the rotatable tube drives a jack shaft 106 through sprocket 108. The jack shaft, through a reversing gear drive 110, gives correct rotation to drive the infeed or intermediate star wheel 44. A sprocket and chain drive located on the vertical shaft 118 is also provided within the lower frame beneath the container infeed components for rotating a right angle gear box 36 for driving the screw conveyor.

The main rotatable tube 14 is secured at an intermediate point to the process star wheel 18 which is actually an assembly, and at an upper point to the upper ring 16. The external periphery of the star wheel is provided with recesses for receiving containers to be processed. The ring 16 supports a plurality of fixtures for utilities. The notches 20 are of a size to receive the necks of bottles immediately beneath the enlarged neck rings thereof by which they are supported.

Shaft 118 has at its upper extent the infeed star wheel 44. The infeed star wheel has cooperable recesses or notches 20 with a size and shape the same as the recesses or notches 20 of the processing star wheel 18 for sequentially transporting the bottles from the screw conveyor 42 to the processing star wheel in a continuing cycle of operation.

Located around the periphery of the process star wheel 18 from the bottle infeed area at about 9 o'clock through the majority of its extent of the star wheel and terminating at the 6 o'clock position is a retention rail 122. The rail insures the retention of the bottles being processed within a predetermined notch at the periphery of the star wheel during its movement through the processing stations. A similar retention rail 124 insures retention of the bottles on the infeed star wheel.

Fluidically coupling the upper tank to the utilities of the upper disk is a lower rotary manifold 130 for rotation with respect thereto. A plurality of ports on the rotary union manifold receive a plurality of tubes 132, one for each recess. The output end of each flexible tube terminates in a fitting of an upper valve 134 operatively adjacent to each notch 20 for providing a flow of water from the upper container 84 to the bottle at each recess 20.

The upper valve 134 is coupled to the upper end of a lower cylinder 136 and functions as a valve to provide the heated water to the associated bottle 22 being processed. The lower end of the upper valve has an additional tube 138 extending to a nozzle 34 located immediately above the opening of the bottle to be processed. The cylinder 136 functions as a motion imparting cylinder for the nozzle 34. The lower or motion imparting cylinder 136 is supported on the support ring 16. The lower cylinder 136 extends downwardly and is extendable against the force of an internal spring, not shown. The support ring 16 is secured in spaced relationship to the process star wheel 18 by the vertical plates 144 which add rigidity to the assembly. One such set of vertical plates 144 along with a lower fluid cylinder 136 and upper valve 134 are provided for each recess 20 of the processing star wheel for each bottle to be processed.

Cams 146, 148 and 150 around the periphery of the machine adjacent to the upper disk provide the timing sequence to the upper valve for allowing the flow of hot water to the bottle and to the lower cylinder for force for activating the movement of the nozzle downwardly into contact with the mouth of the bottle and for the air supply for reshaping purposes.

Cam 146 actuates a valve 146V through an associated cam follower to allow the flow of hot water into the bottle. Actuation of valve 146V is effected through line 146L. Therebeneath is a cam 148 and associated cam follower to allow the flow of air into the bottle through line 148L for moving the nozzle between an upper inoperative position and a lower operative position. Cam 150 actuates valve 150V through an associated cam follower to allow the flow of reshaping air through line 150L. All three of these cams, followers and valves function in a proper operation sequence with respect to each other as described herein. Note is taken that after the reshaping air has returned the bottle to its original shape or essentially its original shape, the flow of air is stopped and the pressure within the bottle is relieved by flowing back through the nozzle to effect the return of atmospheric pressure within the bottle so that the hot water may be properly received therein.

The flow of gas, preferably air, to the bottle is through a vertical tube 14, through line 150L to valve 150 to nozzle 34. The central air supply from the central tube also supplies the operating air to the valves operated by the cams and cam followers.

A fixed manifold 186 adjacent to the bottles is for spraying heated water on the exterior of the bottle for label removal, glue removal and cleaning. Manifold 186 receives its water from the sump via a booster pump. The hot water output from the fixed manifold spray and the hot water from the containers gravity fall to the sump 88 for recirculation purposes.

Associated with each air cylinder is a nozzle 34 for providing air under pressure through the nozzle 34 into the bottle for returning the crushed bottle to its original orientation as shown. Prior thereto the bottle might be crushed or otherwise deformed rendering it less susceptible for being properly acted upon by the various processing steps performed by the machine.

The disassembly machine 12 of the present invention utilizes neck support in the form of a star wheel recess 20 for retaining and moving the bottle. This allows for bottles of irregular shape to be conveyed without affecting the operation of the machine. Neck ring conveying also allows the handling of various size bottles, one piece or two piece, including bottles of various sizes including the more popular, 1, 1½ and 2 liter sizes. No change of parts would be required. Other containers such as jars could likewise be supported and processed. The machine and/or star wheel can be readily modified to accommodate such different containers. This is because the neck sizes of such bottles are generally uniform even though a neck ring may extend to a greater or lesser extent along the central vertical axis of the bottle. Neck ring conveying also eliminates the need for sorting the bottles at the source prior to the machine and does not require stable bottle configurations. Such conveying allows for positive feed from a worm screw 42 to the infeed star wheel 44 to the processing star wheel 18. It also allows for the pneumatic conveying of bottles to the worm screw feed. The neck conveying of the bottles allows for the stepping of the intermediate and processing star wheels which allow for overlap for more secure feed and controlled gripping. Supporting the bottle from an upper extent at the neck ring allows for positive separation of bottles and removal of labels as well as bottle parts such as caps, tamper evident ring, shoulder label, panel label, and base cup.

The present system relies upon shrinkage of the bottle and allows various types of labels to be removed with one uniform system design. The system allows for uniform low or high pressure spray to remove contaminants. It also allows for vertical cuts to drain the interior cleaning liquid. The gravity drain of cleaning liquids and contaminants is also facilitated. The system also keeps the operation at one elevational level for all bottle sizes and accommodates various designs of neck rings on bottles.

In-Feed Station 40

At 9 o'clock, the bottles are fed by a screw conveyor 42 from a preliminary conveyor, preferably pneumatic, and source of used bottles up to the infeed star wheel for subsequent transportation through the various processing stations in a sequential manner. While being transported in the infeed star wheel, the container necks are axially split as through a rotating toothed blade 46 to form a cut downwardly through the screw cap and neck of the bottle to allow the dropping off or mechanical removal of the cap and tamper evident ring.

More particularly, a screw feed 42 is rotatable about a horizontal axis. The screw feed is located adjacent to the 9 o'clock or infeed location of the machine 12. Next following the screw feed conveyor is an intermediate star wheel 44 with peripheral notches 20 and a retention bar 124 adapted to support the neck rings 24 of bottles 22 and transport them sequentially to notches 20 on the processing star wheel 18.

Motion is imparted to the infeed star wheel by a sprocket and chain drive off of the rotating main tube 14 through a jack shaft and reversing gears. The reversing gears give the correct rotation to the infeed star wheel. The screw conveyor 42 is driven by a sprocket and chain drive through a right angle gear box 36 located in the lower frame of the machine.

Opposite ends of the screw feed are supported in bearings 170 to allow the desired rotational motion of the screw feed whereby its threads may contact the upper extent of the containers being conveyed to move them uninterruptedly toward the machine.

At the terminal end of the screw thread, the notches 20 of the infeed star wheel 44 will receive the necks of the transported containers whereby their neck rings 24 will set on the upper surface of the infeed star wheel for support. An associated support plate 124 between the infeed star wheel and the process star wheel insures retention of the bottles in their notches 20 until they are transferred to and supported by the notches 20 of the processing star wheel 18. Again, the lower surface of the neck rings 24 will be supported by the upper surface of the processing star wheel 18 within the notches 20 and retained there by an additional support bar 122 through the majority of their rotational input.

In advance of the infeed screw conveyor is an appropriate conveyor mechanism, preferably an air transportation system of the type disclosed in U.S. Pat. No. 4,822,214 issued Apr. 18, 1989, in the name of Aidlin et al. Such air transportation system includes a pair of horizontally disposed slots having a central opening of a size to receive and support a bottle to be processed by its neck beneath its support ring. The neck rings 24 will be received with its lower surface in contact with the upper surfaces of the slot while the air flow there against will transport the bottle along the length of the conveyor at a rapid speed.

The cutting mechanism 46 is shown as a simple toothed blade rotatable about a horizontal axis disposed to rotate opposite to or against the direction of bottle movement along the path of travel. Such blade will thus cut the upper portion of the bottle as well as the cap axially in half whereby the cap and tamper evident ring will simply fall to a receiving container therebeneath.

Shaping Station 50

The supported bottles 22 are then injected with air under pressure to restore the used bottles to full size, or essentially full size. To effect this end, a supporting ring 16 is positioned above the star wheel 18 secured therebetween by vertical supports 144. The upper valve 134 is coupled to the upper end of a lower air cylinder 136. The lower cylinder 136 has mounted to its lower rod end a nozzle 34. The lower air cylinder 136 is supported on ring 16. The upper valve 134 is a conduit through which the liquid flows. The lower air cylinder 136 acts to reciprocate the nozzle 34 above the mouth of the bottle to be cleaned while in axial alignment therewith. This cylinder when extended also clamps, through the nozzle, the container in place on the processing star wheel.

The lower air cylinder 136 is coupled to an air line 172 for receiving the pressurized air. The lower cylinder has its lower end vertically reciprocable between an upper rest position and lower extended position. During the majority of the rotation of the bottle and operating mechanisms, the lower air cylinder is extended. Shaping air is received at the nozzle from an air valve 150V. Air from the lower valve 150V functions to reciprocate the nozzle into contact with the container opening for the introduction of the shaping air and clamping the container in place. It is the same nozzle 34 which is extended to bring the cleansing fluids into the bottle.

Heating Station

The bottles are then filled, or substantially filled, with hot water, preferably with a detergent, at about 180-190 degrees Fahrenheit to clean the containers and to effect their shrinkage. The heat promotes adhesive loosening while the shrinkage promotes separation of the label and base cup from the container.

The heating fluid is preferably water heated to a temperature of about 180 and 190 degrees Fahrenheit, an expanded range of about 140 to 200 degrees has been found acceptable. The fluid moves from the lower temperature controlled sump 88 to an upper tank 84 through the fixed lines 94 within the frame. Along its path of flow, water passes through the temperature assembly 96 for cleaning and heating and through appropriate conduit lines in the conventional manner. From the upper container, the fluid is gravity fed downwardly into the machine through a rotating union manifold 128 in the roof 80 through fittings into the nozzles on the process star wheel.

From the rotatable fitting, lines 132 couple a plurality of upper valves 134, one for each notch 20 and container 22. This allows the nozzle to move up and down with the extension and retraction of the lower air cylinder 136.

After nozzle contact with the container orifice, an adjustable circumferential cam 146 will open a limit valve 146V through actuation of follower which in turn sends a compressed air signal to the fluid valve mounted on the lower cylinder. This signal will allow hot water to flow through the nozzle from the upper tank by gravity feed through the line to the container for filling it, or essentially filling it, with hot water for its heating and cleaning functions. The adjustable cam 146 and associated rotating follower on limit valves maintain the orifice in contact with the bottle and the flowing of fluids therein from about the 10 o'clock to 2 o'clock positions as shown in FIG. 3. Upon arrival at the 2 o'clock position, the cam 146 functions to actuate the valve 146V and stop the flow of water.

The hot liquid is between 140 degrees Farenheit to 200 degrees Fahrenheit, preferably in the 180 to 190 range. The hot liquid effects the shrinkage of the container or containers with base cups. The base cup does not shrink, but it is loosened from the container through the softening of adhesive to promote base cup and label removal. The hot liquid melts the glue at the lower outer surface of the container bottom so the glue will stay with the base cup at separation. The adhesive stays with the colder material at separation. It also allows base cup separation due to gravity with the adhesive glue staying with the colder material, the base cup. The hot liquid is filled to approximately the top of the label and will, when the container shrinks, tending to allow the adhesive to separate and the label to drop off. The bottle shrinks to the level of hot liquid. Bottle shrinkage allows air jet removal of the base cup and pressurized liquid removal of the base cup as well as mechanical removal of the base cup. As shown herein the fall is by gravity, but it could be readily done by pressurized liquid.

Base Cup Stripping Station 54

Each rotating bottle is subjected to high pressure air and/or water from manifold 156 to urge the base cup 30 downward from the container 28. The spray could be continuous or pulsating. To ensure removal, each bottle is mechanically intercepted by self adjusting fingers 56 and 58 which function as a final assurance of base cup removal, to urge the base cups downwardly onto a conveyor for movement to a granulator for recycling.

Figure 7:
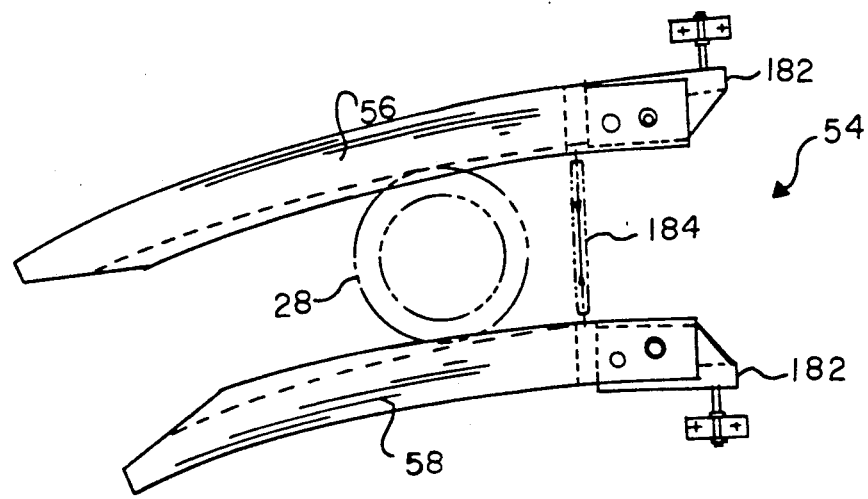
FIGS. 7 and 8 are plan and elevational views of the base cup removing fingers.
Figure 8:
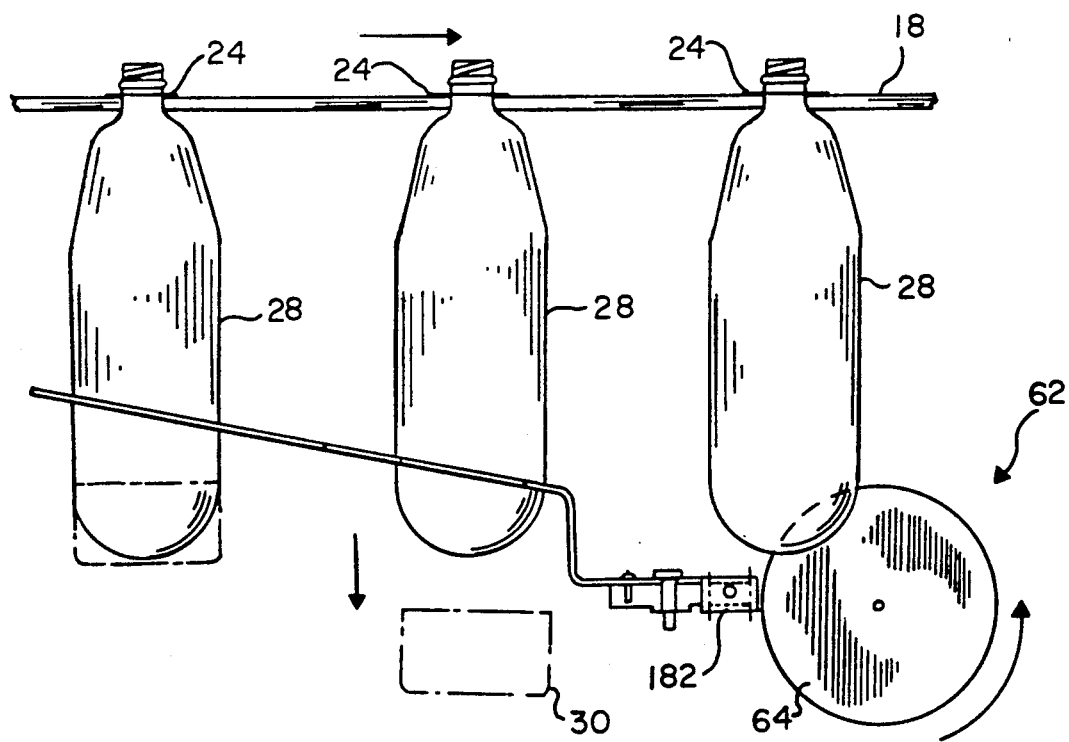
Figure 9:
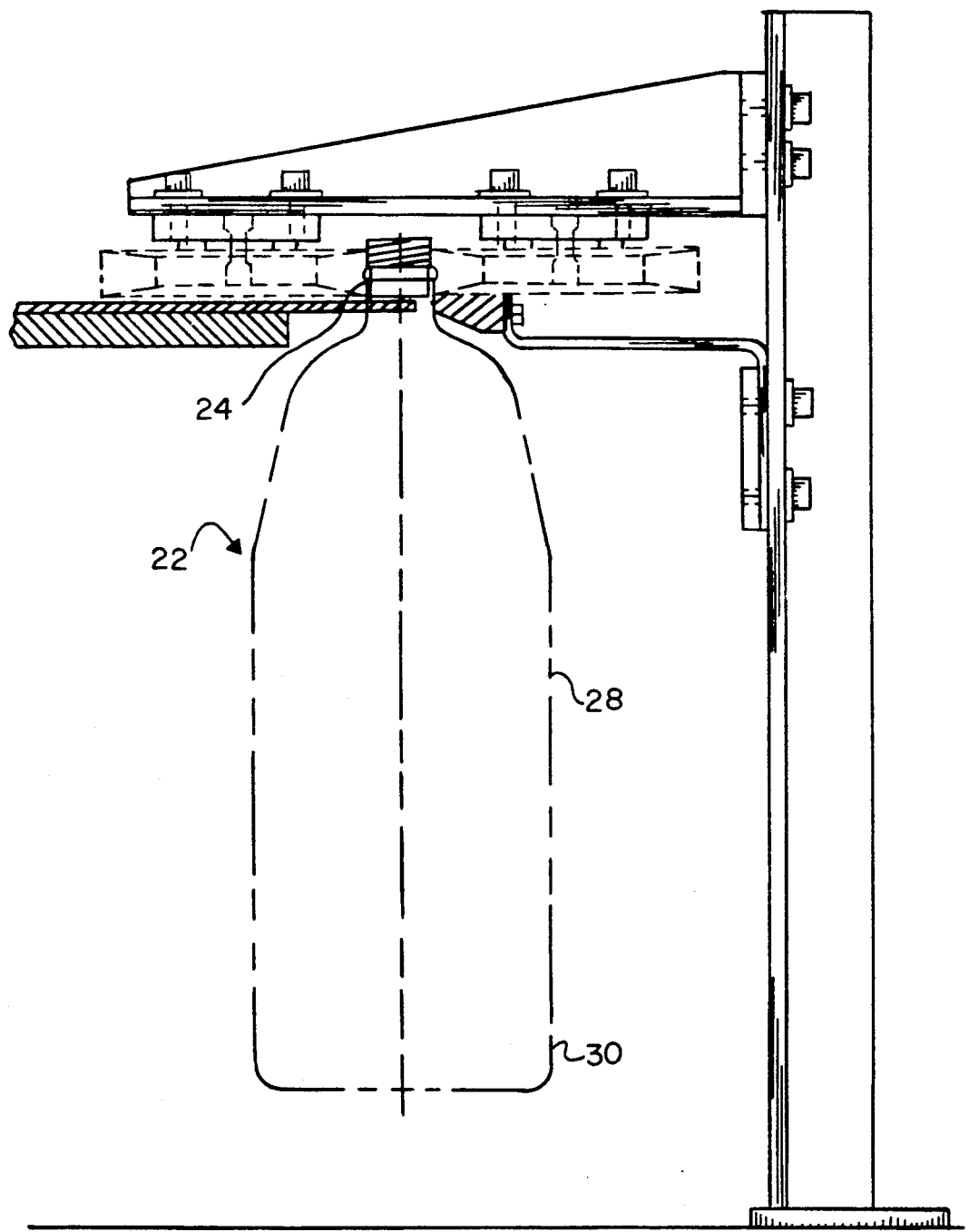
FIG. 9 is a sectional view of a portion of the processing star wheel and a supported bottle illustrating horizontally mounted brushes for removing caps and tamper evident rings, if any.

Each of the associated fingers 56 and 58 is located on an opposite side of the central vertical axis of the container to be stripped. The fingers themselves extend generally in the direction of motion of the bottle, clockwise as seen in FIGS. 3 and 7. The fingers extend at the leading edge from an elevated location in contact with the container downwardly to a position wherein the bottle moving in contact therewith will have its base cup contacted by the inner faces of the stripper fingers. The base cups will be urged downwardly having had their adhesion to the container loosened by the heat of the fluid loosening the coupling adhesive and by the shrinkage of the bottle with respect to the base cup at a different rate of shrinkage. The leading edges of the associated fingers are tapered radially inwardly to the central axis of the bottle to insure proper alignment and will allow the processing of various size containers without adjustment.

The trailing edge of the fingers extend downwardly then extend essentially horizontally, terminating in an upper plate which is aligned with apertures in L-shaped brackets 182 to which they are coupled by a pair of securement bolts. The L-shaped brackets are held in their set positions by horizontal pins extending through fixed brackets mounted to the frame of the machine. A spring 184 couples the interior edges of the fingers at their horizontal portion to insure that they return to a preset closed position so they will work with bottles of varying diameters. The stripper fingers are, actually, redundancy strippers since the action of the heat to loosen the adhesive and treat the bottle normally are sufficient to allow the base cup to automatically drop by gravity therefrom. In the event that such droppage does not occur, the stripper fingers will effect such result.

In association therewith is a conveyor 188 located beneath the stripper fingers to receive the base cups as they fall from the container. The conveyor is located to extend from internal of the machine through an opening in a side wall to exterior of the machine. The base cup is thereby conveyed to a location for being processed as through granulation and remolding into a recycled article for further use. The operating mechanisms of the conveyor are outside of the machine and independent thereof. The conveyor belt is of a mesh like material to allow water to fall therethrough.

For those applications where a one-piece bottle or container is being processed, this station may be inactivated or removed. In the alternative, the machine could be fabricated without the manifold 156, fingers 56 and 58, and conveyor 188.

Label Removal 60

High pressure liquid, preferably water, is sprayed by nozzles of a manifold 186 over the exterior surface of the bottle for label removal and cleaning. A conveyor 190 therebeneath removes all the label material.

The manifold for spraying the bottle for label removal and exterior cleaning is fixedly located between the 3 and 5 o'clock positions. A booster pump feeds water from the sump to and through the manifold. The manifold is located radially exteriorly of the bottle to spray hot water against the exterior surface of the container and any label that might be thereon. Initial loosening of the label occurs due to the heating solution shrinking the bottle. Label removal is through the pressure created by the spray of water from the manifold. Heated water is conveyed through the lines to the nozzle. A line conveys the fluid to the manifold and the manifold conveys the water to the nozzles. From the nozzles the water is directed against the labels in a downward direction and back into the sump located in the lower frame. The high pressure is created by pressure booster pump and its quantity as it moves through the orifice of the nozzles. Small apertures in the nozzles function as spray direction control and generate label removing pressure, continuous or pulsating, to the liquid and for cleaning purposes.

Located beneath the containers in the area of the manifold and nozzles is a conveyor 190 extending through an opening in the adjacent side wall of the machine. The conveyor belt is provided with openings of sufficient size to allow the cleaning water to flow to the sump. The apertures are sufficiently small to collect the separated label material which is then conveyed to exterior of the machine for removal therefrom.

The liquid may be from 140 to 200 degrees Fahrenheit, and at a pressure of preferably between 100 and 600 psi. The liquid will remove the label from the bottle, it will also remove any remaining adhesive contamination from the base cup area or label area. It may be a high pressure continuous stream or a pulsating liquid, or aerated, jet. It could be a clear liquid or a liquid mixed with a detergent, natural or synthetic. High pressure liquid can also be mixed with high pressure air. A further alternative is steam. Any appropriate combination of liquid, air, etc. is readily utilized.

Cutting Station 62

Shortly before the 6 o'clock position, the lower portion of each bottle is cut to allow the fluid from the bottle to drain to a sump for recycling back to the water tank located above the rotating tube column. At the cutting station is any type of simple cutter to effect this piercing of the container. It is preferably a toothed circular blade 64 in the plane of bottle movement. Thereafter its liquid contents may gravity fall from the container to the sump 88. In the preferred embodiment, it is a simple, rotary toothed blade rotatable about a horizontal axis which is positioned so that various sizes of rotating containers will move into contact with the blade and travel along the plane of the blade for being cut and effecting its purpose of liquid removal. The cut is made vertically through the bottom of the container to maximize the gravity drain and to reduce any leftover water that could be conveyed to the granulator and have to be replaced and dried from the material.

Discharge Station 66

The bottles are then fed by a conveyor 192 to the granulators, not shown. Along the conveyor path, within the machine or otherwise, the bottles may be separated manually or automatically as a function of their color. However, it is preferred to determine this in the machine and discharge containers into the two separate discharge positions.

The discharge is effected by a finger 194 located and pivoted from the radially inward side of the path of movement of the container. This is in the location with the termination of the lateral bottle support bar 122 extending from the 6 o'clock or in-feed station totally around and extending beyond the cutting station. The retraction of the lower air cylinder and the simple absence of such support bar, in combination with the presence of the finger 194 thrusting outward, will exert a radially outward movement to the bottle whereby it will fall from the notch 20 onto a third conveyor belt 192 similar to the first two conveyor belts. The third conveyor belt extends through an opening in the adjacent side wall of the machine for conveying the bottle to a remote location. Along the path of the conveyor, the containers may be separated in accordance with color, either manually or automatically. However, it is preferred to determined color within the machine and separate into two separate discharge positions. In this manner, containers of one color or the other may be granulated as a group for the recycling process.

State of the art electronics can be used to detect the color of the containers that sequentially there pass. Based on such optical color detection, the containers may be ejected into separate discharge paths for individual granulation.

Mode of Operation

In operation and use, the bottles are fed continuously and automatically at an infeed station by a screw conveyor from a preliminary air transportation conveying system and source of used bottles up to the rotating infeed star wheel for subsequent transportation through the various processing stations of the machine. While in the infeed star wheel, the bottles being fed are axially split by a rotating toothed blade to form a cut downwardly through the screw cap, tamper evident ring, and neck of the bottle. The dropping off of the cap and tamper evident ring may thus be automatically effected. The supported containers are then sequentially injected with air under pressure while being conveyed through a shaping station. Such injection restores the used containers to their full and original, or essentially original, size and shape prior to further processing. Having been restored to their proper size and shape, the containers are then sequentially filled, or substantially filled, with hot water to clean the containers and to effect their shrinkage. The heat promotes adhesive softening while the shrinkage promotes separation of the labels and, for containers with base cups, base cups from the containers. Each rotating container is sequentially subjected to high pressure air and water at a base cup stripping station to urge the base cup downward for promoting its removal from the container. Each base cup is then sequentially intercepted by mechanical fingers which function to assure prior separation of the base cup, contact and urge the intercepted base cup downwardly onto a conveyor for movement to a granulator for recycling remote from the machine. High pressure water is then sprayed over the exterior surface of the container at the label stripping station for label removal and cleaning. A conveyor therebeneath transports the label material away from the machine. Shortly before the 6:00 position, the lower portion of each bottle is cut by a circular rotating toothed blade at a cutting station. The cut allows the fluid from the bottle to drain to a sump for recycling back to the water tank located above the rotating tube column for use in processing in a continuous and automatic cycle of operation. Lastly, at a discharge station, the containers are then removed from the star wheel assembly and fed by a conveyor to the granulators remote from the machine. Along the conveyor path, the containers may be separated manually or automatically as a function of their color. However, it is preferred that color separation be done within the processing machine so the containers can be removed into separate conveyor paths to the granulators.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. Apparatus for recycling used plastic containers comprising:
   conveyor means for supporting used plastic containers and for sequentially moving the supported containers in a continuous and automatic cycle of operation, the conveyor means having notches for receiving the containers by neck rings;
   means to insert hot liquid to essentially fill the supported containers for effecting their contraction and for cleaning purposes;
   means to remove the liquid from the containers, the means to insert and the means to remove being located adjacent to the conveyor means for operation upon a plurality of containers in a continuous and automatic cycle of operation;

means to convey the containers for granulating and reuse in molding recycled articles, the containers being two piece containers with an upper container portion and lower base cup portion and further including means for separating the base cup portions from the container portions after the means to insert hot liquid, the means for separating including fixed finger means which function to contact and confirm base cup removal by downwardly urging the intercepted base cup.

* * * * *